United States Patent [19]
Peczkowski

[11] 3,818,921
[45] June 25, 1974

[54] FLUID FLOW THROTTLING VALVE

[75] Inventor: Joseph L. Peczkowski, South Bend, Ind.

[73] Assignee: The Bendix Corporation, South Bend, Ind.

[22] Filed: Sept. 15, 1972

[21] Appl. No.: 289,524

[52] U.S. Cl............................ 137/501, 137/505.18
[51] Int. Cl............................................ F16k 17/02
[58] Field of Search.......... 137/501, 505.18, 505.14, 137/505.15, 505.41

[56] References Cited
UNITED STATES PATENTS

| | | | |
|---|---|---|---|
| 1,640,842 | 8/1927 | Loomis | 137/501 |
| 1,864,250 | 6/1932 | Lucas | 137/501 X |
| 1,923,595 | 8/1933 | Temple | 137/505.18 X |
| 3,621,867 | 11/1971 | Johnson | 137/505.18 X |

Primary Examiner—Henry T. Klinksiek
Assistant Examiner—Robert J. Miller
Attorney, Agent, or Firm—Gordon H. Chenez; William N. Antonis

[57] ABSTRACT

A fluid pressure responsive poppet type flow throttling valve having a wide range of flow control and provided with relatively large areas exposed to control fluid pressures. The valve is spring loaded by two springs one of which is active in part range flow control only. The valve is contoured to provide a predetemined valve area vs valve travel to provide gain control and/or a predetermined flow range. In addition to the above, other structural features including an adjustable stop to control minimum valve flow area serve to minimize undesirable characteristics such as instability, excessive droop and/or reliabliity.

6 Claims, 1 Drawing Figure

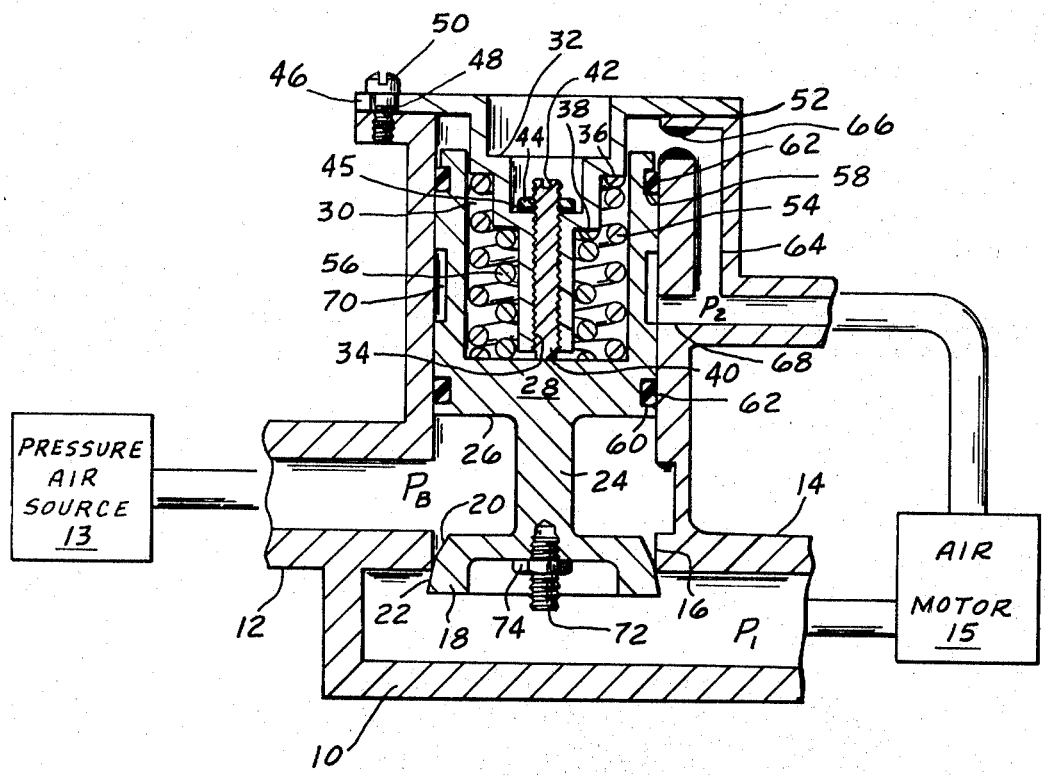

FLUID FLOW THROTTLING VALVE

BACKGROUND OF THE INVENTION

Throttling valves for controlling liquid or air flow through a conduit are well known. The undesirable flow control characteristics of known throttling valves particularly in a flow system where accurate and reliable control over a relatively large flow range is necessary are well known. Such undesirable characteristics may include valve instability, excessive droop, lack of flow capacity, unreliability, structural complexity and/or poor response. Some attempts have been made to provide a throttling valve wherein certain of the above-mentioned undesirable characteristics are minimized or deleted but at the expense of worsening the remaining undesirable characteristics or introducing new areas of problem.

It is, therefore, an object of the present invention to provide a throttling valve for controlling fluid flow over a relatively wide range of flows with improved valve characteristics including control stability and reliability.

It is another object of the present invention to provide a structurally simple throttling valve adapted to control liquid or air flow over a relatively wide range of flows with control stability and reliability.

Other advantages of the present invention will be apparent from the following description taken with the accompanying drawing.

BRIEF DESCRIPTION OF THE DRAWING

The drawing represents a schematic view in section of the present invention.

DESCRIPTION OF THE PREFERRED EMBODIMENT

Numeral 10 designates a casing having an inlet 12 connected to a suitable source of pressurized fluid 13 generally indicated in block form, and an outlet 14 connected to a fluid receiver 15 generally indicated in block form which receiver, for example, may be a conventional air operated motor adapted to operate in response to a predetermined air pressure differential $P_1-P_2$ imposed thereon.

The casing 10 is provided with a flow orifice 16 in series with inlet 12 and outlet 14. A valve 18 having first and second radially inwardly tapering annular faces 20 and 22 is adapted to seat against the downstream edge of orifice 16. The valve 18 is connected via an integral stem 24 to the closed face 26 of a cup-shaped piston 28 slidably carried by casing 10 and partially defining a chamber 30. The chamber 30 is further defined by a stepped annular member 32 having a central threaded opening 34 and spring retaining step portion 36 and 38. An adjustable stop 40 threadedly engaged with opening 34 and extending therethrough is engaged by piston 28 to thereby limit travel of the same and thus the closed position of valve 18. The stop 40 is provided with a slot 42 or the like for adjustment of the same and further provided with a lock nut 44 for fixing the position of the stop 40. A suitable fluid seal such as flexible washer 45 may be provided intermediate lock nut 44 and annular member 32 to guard against fluid leakage past stop 40.

The annular member 32 is provided with a radially outwardly extending annular flange 46 having spaced apart openings 48 therein through which bolts 50 extend into threaded engagement with casing 10 to thereby fixedly secure annular member 32 in position on casing 10. A suitable gasket 52 interposed between flange 46 and casing 10 provides a fluid seal.

A compression spring 54 interposed between step portion 36 and piston 28 and a relatively greater rate compression spring 56 interposed between step portion 38 and piston 28 loads piston 28 in a direction to open valve 18. Spaced apart annular recesses 58 and 60 in piston 28 are adapted to receive associated "O" rings 62 thereby providing sliding fluid seals.

The chamber 30 is vented to control air pressure source $P_2$ via a passage 64 having a damping restriction 66 therein. A branch passage 68 communicates passage 64 with an annular recess 70 in piston 28 intermediate recesses 58 and 60.

An adjustable stop 72 threadedly secured to valve 18 is adapted to engage casing 10 to limit the maximum open position of valve 18. A lock nut 74 is provided to fixedly secure stop 72 in position.

Assuming no flow of pressurized air to inlet 12 the pressures $P_B$, $P_1$ and $P_2$ are equalized. The effective areas of piston 28 and valve 18 against which pressures $P_2$ and $P_1$, respectively, act are substantially equal such that a corresponding zero force differential exists with such pressures $P_1$ and $P_2$ equalization. Likewise the effective areas of piston 28 and valve 18 exposed to pressure $P_B$ are equal thereby providing a corresponding force balance. The valve 18 is urged to a maximum open position as defined by stop 72 under the influence of spring 54. The spring 54 is active throughout the range of travel of valve 18 whereas spring 56 is active over a portion of the range of travel of valve 18 as will be described.

Assuming a flow of pressurized air $P_B$ to inlet 12 is established, the pressure $P_1$ rises accordingly tending to urge valve 18 toward a closed position in opposition to spring 54. The pressurized air $P_2$ is applied through damping restriction 66 to chamber 30 where it acts against piston 28 in opposition to pressure $P_1$. Depending upon flow requirement of the air motor the valve 18 will move to a position relative to orifice 16 whereby the pressure $P_1$ is regulated to maintain the desired $P_1-P_2$ pressure differential. It will be noted that the valve 18 area change vs valve travel characteristic varies depending upon which of the two tapered annular faces 20 and 22 is adjacent the downstream edge of orifice 16. In the closed position of valve 18 as shown in the drawing, the tapered face 22 engages orifice 16 approximately at the mid-portion of face 22. The face 20 and the upstream portion of face 22 have substantially the same axial dimension such that the effective flow area of orifice 16 in an opening direction increases a smaller amount at low flow conditions than it will at higher flow conditions for a given valve 18 movement thereby promoting stability of valve 18 over its entire operating range. The angle of taper of face 22 relative to face 20 may vary to suit conditions but, in one application, it has been found that desired stability of valve 18 may be obtained by providing face 22 and 20 with taper angles of 10° and 20°, respectively. Obviously, the contour of faces 20 and 22 may take various forms other than the taper form shown depending upon the flow area vs travel relationship desired.

In the closed position of valve 18, the springs 54 and 56 are both active to load valve 18. As the valve 18 moves from its closed position, the spring 56 load decreases to zero over the range of movement of valve 18 wherein face 22 determines the effective area of orifice 16 whereupon the load imposed on valve 18 is derived from spring 54 for the remaining travel of valve 18. In this manner, the well known droop characteristic of valve 18 is reduced at a predetermined position of valve 18 to improve the flow regulating accuracy of the same.

It will be noted that the chamber 30 reduces to a relatively small volume as the valve 18 moves into seating engagement with orifice 16 which, in the case of chamber 30 being pressurized by air or gas, serves to increase the damping effect derived from damping restriction 66 as the valve 18 closes thereby tending to improve valve stability.

The annular recess 70 serves to prevent leakage of air at pressure $P_B$ into chamber 30 downstream from damping restriction 66. Since such leakage of pressurized air $P_B$ to passage 64 is normally confined to small flow there is no significant effect on the air at pressure $P_2$ passing through damping restriction 66.

It will be recognized that the above described valve structure is equally applicable to control of liquid although certain of the advantages of the valve 18 may not be realized to the extent of use with gas flow.

I claim:

1. Fluid flow control apparatus comprising:
   a conduit including a flow orifice for conducting pressurized fluid from a source to a receiver;
   valve means operatively connected to said flow orifice for varying the effective flow area thereof;
   a fluid chamber;
   fluid pressure responsive means including a fluid pressure responsive member slidably carried in said chamber and operatively connected to said valve means for actuating the same;
   first passage means including a damping restriction for conducting a variable control pressurized fluid to said chamber;
   said fluid pressure responsive member being exposed on one side to said pressurized fluid in said conduit and on an opposite side to said control pressurized fluid in said chamber; said control pressurized fluid being at a relatively lower pressure;
   an annular recess in said fluid pressure responsive member for receiving leakage of fluid between adjacent surfaces of said member and said chamber; and
   second passage means connecting said annular recess with said first passage means upstream from said damping restriction.

2. Fluid flow control apparatus as claimed in claim 1 and further including:
   a fixed spring retaining member extending into said chamber and defining a fixed closed end of said chamber;
   a stop member adjustably secured to said spring retaining member and engaged by said fluid pressure responsive member to limit movement of said fluid pressure responsive member in a direction to close said valve means; and
   first and second concentric compression springs interposed between respective first and second portions of said stop member and said fluid pressure responsive member for loading said fluid pressure responsive member in a direction to open said valve means;
   said first compression spring being rendered inoperative to load said fluid pressure responsive member at a predetermined position of said valve means.

3. Fluid flow control apparatus as claimed in claim 2, wherein:
   said valve means is provided with first and second annular tapered surfaces adapted which cooperate with said orifice to vary the effective flow area thereof;
   said first and second annular tapered surfaces having different angles of taper to thereby establish a variable orifice area vs valve travel relationship over a first range of travel of said valve means and a second orifice area vs valve travel relationship over a second range of travel of said valve means.

4. Fluid flow control apparatus as claimed in claim 1, wherein:
   said valve means is responsive to the fluid pressure in said conduit downstream from said orifice which acts in opposition to said control fluid pressure;
   said valve means being operative to maintain a pressure differential between said control fluid pressure and said pressure downstream from said orifice in accordance with the force load derived from said first and second compression springs.

5. Fluid flow control apparatus as claimed in claim 1, wherein:
   said valve means is responsive to the fluid pressure in said conduit upstream from said orifice and urged in an opening direction in opposition to the fluid pressure in said conduit upstream from said orifice acting against said fluid pressure responsive member thereby providing a corresponding force balance.

6. Fluid flow control apparatus as claimed in claim 2, and further including:
   second adjustable stop means for limiting movement of said valve means in an opening direction.

* * * * *